United States Patent Office 3,838,099
Patented Sept. 24, 1974

3,838,099
UV STABILIZING SYSTEM FOR POLYMERIC MATERIALS COMPRISING PHENYL BENZOATE AND NICKEL OR COBALT COMPLEXES OF PARTIALLY FLUORINATED BETA DIKETONE
Ronald D. Mathis, Taylors, S.C., assignor to Phillips Petroleum Company
No Drawing. Filed Sept. 5, 1972, Ser. No. 286,044
Int. Cl. C08f 45/58
U.S. Cl. 260—45.75 N                    12 Claims

ABSTRACT OF THE DISCLOSURE

Ultraviolet light stabilizers for polymers comprising mixtures of hydroxy-substituted phenyl benzoates and metal complexes of partially fluorinated beta diketones are described. A preferred embodiment includes polyolefin compositions containing 2′,4′-di-t-butylphenyl 3,5-di-t-butyl-4-hydroxybenzoates and a nickel complex of 1,1,1-trifluoro-7-methyl-1,4-octanedione.

---

This invention relates to ultraviolet light stabilizing additives and polymeric compositions containing said additives.

Various organic stabilizing additives are known to improve the ultraviolet light stability of polymeric materials. The prior art has disclosed the use of hydroxy-substituted phenyl benzoates or nickel complexes of partially fluorinated beta diketones, singularly or in combination with other materials, to improve the ultraviolet light stability of polymeric compositions. Heretofore, however, none of the prior art disclosures has suggested the use of combinations of hydroxy-substituted phenyl benzoates with nickel or cobalt complexes of partially fluorinated beta diketones to improve the ultraviolet light stability of polymeric materials. More particularly, the prior art teachings have not demonstrated the unexpected results obtained by the use of the aforesaid combination of hydroxy-substituted phenyl benzoates with nickel or cobalt complexes of partially fluorinated beta diketones wherein the combined effect of the two ultraviolet light stabilizing additives is greater than the effect obtained when either is employed separately for a similar purpose.

It is an object of this invention to provide ultraviolet light stabilizing additives for polymeric materials. Another is to provide ultraviolet light stabilized polymeric compositions. Still another object is to provide economic and suitable methods of preparing ultraviolet light stabilized polymeric compositions. These and other objects will be readily apparent from the written description and the appended claims.

In accordance with this invetion ultraviolet light stabilizing compositions for polymeric materials comprising, as a first component, hydroxy-substituted phenyl benzoates, and as a second component, a metal complex of a partially fluorinated beta diketone, are provided. An additional embodiment of this invention provides for ultraviolet light stable polymer compositions containing the aforesaid first and second components.

The first component hydroxy-substituted phenyl benzoates that can be employed in the practice of this invention include compounds represented by the formula

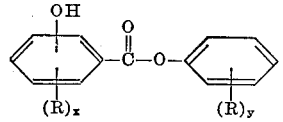

wherein each R group independently represents halogens, an acyclic radical having up to 20 carbon atoms or a cyclic radical having up to 20 carbon atoms, $x$ is an integer having a value of from 0 to 4, and $y$ is an integer having a value of from 0 to 4. Particularly preferred acyclic and cyclic radicals are aliphatic, alicyclic, aromatic hydrocarbyl or hydrocarbyloxy radicals and combinations thereof having up to 10 carbon atoms. Representative of hydroxy-substituted phenyl benzoates that can be employed are:

phenyl 4-hydroxybenzoate;
2′,4′-di-t-butylphenyl 3,5-di-t-butyl-4-hydroxybenzoate;
2′,4′-dicyclooctylphenyl 3,5-dicyclooctyl-4-hydroxybenzoate;
2′,4′-dioctadecylphenyl 3,5-dipentadecyl-4-hydroxybenzoate;
2′,4′-di(2,2-dimethylpentyl)phenyl 3,5-di(2,2-dimethylpentyl)-4-hydroxybenzoate;
4′-octylphenyl 3,5-di-t-butyl-4-hydroxybenzoate;
3′,5′-dilaurylphenyl 3,5-di-t-octyl-4-hydroxybenzoate;
2′-t-butylphenyl 3,5-di(2,2-diethylbutyl)-4-hydroxybenzoate;
2′-chloro-4′-octylphenyl 3,5-di-t-butyl-4-hydroxybenzoate;
p-bromophenyl 3,5-di-t-butyl-4-hydroxybenzoate;
p-bromophenyl 3,5-di-t-butyl-4-hydroxybenzoate;
o-phenylphenyl 3,5-di-t-butyl-4-hydroxybenzoate;
p-phenylphenyl 3,5-di-t-butyl-4-hydroxybenzoate;
p-methoxyphenyl 3,5-di-t-butyl-4-hydroxybenzoate;
phenyl 3,5-di-t-butyl-4-hydroxybenzoate;
4′-phenoxyphenyl 3,5-di-t-butyl-4-hydroxybenzoate;
4′-cyclopropoxyphenyl 3,5-di-octyl-4-hydroxybenzoate;
4′-octadecylphenyl 3,5-di-t-amyl-4-hydroxybenzoate;
4′-dodecylphenyl 2-n-decyl-4-hydroxybenzoate;
p-octylphenyl salicylate;
p-hexadecylphenyl salicylate and mixtures thereof.

The second component metal complexes of the partially fluorinated beta diketones that can be employed in the practice of this invention include those represented by the formula

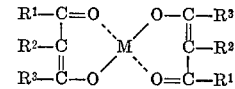

wherein $R^1$ is $CX_3$, X is a halogen, each $R^2$ group independently represents hydrogen, an acyclic radical having up to 20 carbon atoms, or a cyclic radical having up to 20 carbon atoms, each $R^3$ group independently represents an acyclic radical having up to 20 carbon atoms, or a cyclic radical having up to 20 carbon atoms, and M is a divalent metal selected from the group consisting of nickel or cobalt. Particularly preferred acyclic and cyclic radicals are aliphatic, alicyclic, aromatic and heterocyclic radials and combinations thereof having up to 10 carbon atoms. Representative of metal complexes of partially fluorinated beta diketones are bis(1,1,1-trifluoro-2,4-pentanedione)nickel(II),
bis(1,1,1-trifluoro-5,5-dimethyl-2,4-hexanedione)nickel (II);
bis[4,4,4-triiodo-1-(2-thienyl)-1,3-butanedione]nickel (II);
bis[4,4,4-trifluoro-1-(2-furyl)-1,3-butanedione]nickel (II);
bis[4,4,4-trifluoro-1-(3-pyridyl)-1,3-butanedione]nickel (II);
bis(1,1,1-trifluoro-2,4-pentanedione)cobalt(II);
bis(1,1,1-trifluoro-5,5-dimethyl-2,4-hexanedione)cobalt (II);
bis[4,4,4-triiodo-1-(2-thienyl)-1,3-butanedione]cobalt (II);
bis[4,4,4-trifluoro-1-(2-furyl)-1,3-butanedione]cobalt (II);

bis[4,4,4-trifluoro-1-(3-pyridyl)-1,3-butanedione]cobalt (II), and the like and mixtures thereof. One of the most effective nickel complexes is bis(1,1,1-trifluoro-7-methyl-2,4-octanedione)nickel(II).

The polymeric materials that can be employed in the practice of this invention are normally solid polymers derived from unsaturated monomers including homopolymers, copolymers, blends of a variety of at least two polymers selected from homopolymers or copolymers, including polymers of aliphatic 1-olefins (polyolefins); poly (vinyl-substituted aromatic compounds) such as polystyrene; poly (vinyl halides) such as poly (vinyl chloride); poly (vinyl acetate); and the like. Said polymers are advantageously stabilized by the addition thereto of the combination of at least one hydroxy-substituted phenyl benzoate and at least one metal complex of a partially fluorinated beta diketone. Preferred polymers in the practice of this invention include homopolymers and copolymers derived from 1-monoolefins having from 2 to 8 carbon atoms. In most instances, the presently preferred polymers are ethylene or propylene homopolymers, or are copolymers of ethylene or propylene with minor amounts of monomers copolymerizable therewith such as propylene or ethylene, butene-1, hexene-1, ocetene-1, and the like. Polymers wherein at least 50 mole percent is derived from polymerization of ethylene or propylene monomeric units are preferred. Even more preferred are polymeric materials wherein at least 90 mole percent of the polymer is derived from ethylene or propylene monomer units. Of even more importance are propylene polymers wherein at least 90 mole percent of the polymer is derived from propylene and from about 0.5 to 10 mole percent of the polymer is derived from a comonomer selected from ethylene, butene-1, pentene-1, or hexene-1, since such polymers are preferably employed in the manufacture of ultraviolet light stabilized fibers and films.

The stabilizer components set out hereinbefore can be incorporated in the polymers in the practice of this invention in any suitable manner. In general, each component is incorporated in individual amounts of from about 0.05 to about 2.5 parts by weight, preferably about 0.1 to about 1 part by weight, per 100 parts of polymer by weight. The weight ratio of the respective components with respect to each other can vary over a wide range, but in general will be in the range of from about 10:1 to about 1:10, preferably in the range of about 4:1 to about 1:4, and more preferably in the range of about 3:1 to about 1:3.

In the preparation of the ultraviolet light stabilized polymer compositions suitable methods of preparation comprise admixing the components in conventional polymer process equipment for a sufficient period of time and at adequate temperatures to intimately combine polymer with the ultraviolet light stabilizing components to obtain at least substantially uniform dispersion of the ultraviolet light stabilizing components in the polymer. Suitable methods of incorporation include dry blending with polymer powders or pellets in tumble mixers, Henschel mixers, and the like. Alternatively, polymer and stabilizer components can be admixed in screw extruders, Banbury mixers, Brabender mixers, roll mills, and the like, in order to blend the stabilizers with molten polymer or polymer mixtures. Alternately, the stabilizer components can be sprayed on the polymer powder from a solution or dispersion in acetone, methanol, cyclohexane, aromatic hydrocarbons such as benzene, and the like, prior to pelletizing of the polymeric compositions. In general, when a solvent is employed, it is usually removed by evaporation prior to final processing of the polymeric composition into its final form.

In addition, conventional additives such as fillers, pigments, plasticizers, thermal stabilizers, antioxidants, lubricating and processing additives such as fatty acid salts of stearic acid, e.g., calcium stearate, can be incorporated during admixture of the ultraviolet light components of this invention with the polymer materials in accordance with the methods described hereinbefore.

Set out hereafter is an example in further illustration of the invention which is not to be considered as unduly limitative thereof.

EXAMPLE

The 2',4' - di - $t$-butylphenyl 3,5-di-$t$-butyl-4-hydroxybenzoate, designated hereinafter as "A," and bis(1,1,1-trifluoro-1-methyl-2,4-octanedione) nickel (II) hereinafter designated as "B," were added individually or in combination to polypropylene having a nominal melt flow value of about 3. In each evaluation the same polypropylene was employed which, in combination with the additive added there for ultraviolet light stability, was formed into films having a thickness of 5 mils which were subsequently exposed in an Atlas twin enclosed carbon arc Weather-O-Meter operated without the water-spray cycle and modified by the incorporation therein of eight fluoroescent sun lamps. Samples were tested for failure every 20 hours by subjecting each film strip to a rolling motion such that the entire length of the film strip was bent approximately 180°. The samples failed when the film strips broke. The results of the test were as follows:

TABLE I

| Stabilizer | Amount, php [1] | | Hours to failure |
|---|---|---|---|
| | A | B | |
| | | | 67 |
| A | 0.5 | | 447 |
| B | | 0.5 | 433 |
| A and B | 0.25 | 0.25 | 887 |
| A and B | 0.35 | 0.15 | 607 |
| A and B | 0.15 | 0.35 | 833 |

[1] Parts of stabilizer by weight per 100 parts of polypropylene by weight.

The polypropylene samples employed contained 0.05 part per 100 parts of octadecyl[3-(3,5-di-$t$-butyl-4-hydroxyphenyl)]propionate as an antioxidant for the purpose of stabilizing the polymer against oxidative degradation primarily during extrusion of the blend and not for the purposes of facilitating the operability or efficacy of the ultraviolet light stabilizing additives of the invention.

As indicated by the above data, it is readily apparent that the ultraviolet light stabilizing combinations of A and B produce a stabilized polymer composition having greater ultraviolet light stability than that afforded the polymeric composition when either one of the aforementioned stabilizer additives is employed alone in comparable quantities. In addition, variations in the proportions of stabilizing additives indicates that the increased efficacy of the combination of the additive package is achieved over a wide range of proportions of additives employed.

With respect to the antioxidant employed in the ultraviolet light stabilized polymers of this invention, other well-known types of antioxidants commonly employed with polymeric materials such as tetrakis[methylene(3,5-di - $t$ - butyl-4-hydroxyhydrocinnamate)]methane, 2,6-di-$t$ - butyl - 4 - methylphenol, di-$n$-octadecyl(3,5-di-$t$-dibutyl-4-hydroxybenzyl)phosphonate can be used in lieu of or in combination with the aforesaid antioxidants without deleteriously affecting the efficacy of the ultraviolet light stabilizing component combinations of this invention.

Further modifications of the teachings of this invention by the use of hydroxy substituted phenyl benzoates and metal complexes of partially fluorinated beta diketones to impart unexpected improvements in ultraviolet light stability to polymeric materials will be apparent to those skilled in the art.

I claim:

1. A composition of matter useful as a stabilizer for polymer, said composition comprising a mixture of (a) at least one hydroxy-substituted phenyl benzoate represented by the formula:

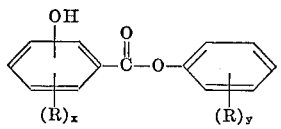

wherein each R group independently represents halogens, an acyclic radical having up to 20 carbon atoms or a cyclic radical having up to 20 carbon atoms, $x$ is an integer having a value of from 0 to 4, and $y$ is an integer having a value of from 0 to 4; and (b) at least one metal complex of a partially fluorinated beta diketone represented by the formula:

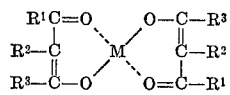

wherein $R^1$ is $CX_3$, X is a halogen, each $R^2$ group independently represents hydrogen, an acyclic radical having up to 20 carbon atoms, or a cyclic radical having up to 20 carbon atoms, each $R^3$ group independently represents an acyclic radical having up to 20 carbon atoms, or a cyclic radical having up to 20 carbon atoms, and M is a divalent metal selected from the group consisting of nickel or cobalt; the ratio by weight of said at least one hydroxy substituted phenyl benzoate and said at least one metal complex of a partially fluorinated beta diketone being within the range of from about 3:1 to 1:3.

2. A composition in accord with claim 1 wherein said at least one metal complex of a partially fluorinated beta diketone is bis(1,1,1-trifluoro-7-methyl-2,4-octanedione) nickel(II).

3. A composition in accord with claim 1 wherein said at least one hydroxy-substituted phenyl benzoate is 2′,4′-di-t-butylphenyl 3,5-di-t-butyl-4-hydroxybenzoate.

4. A composition in accord with claim 1 wherein said at least one metal complex of a partially fluorinated beta diketone is bis(1,1,1-trifluoro-7-methyl-2,4-octanedione) nickel(II) and said at least one hydroxy-substituted phenyl benzoate is 2′,4′-di-t-butylphenyl 3,5-di-t-butyl-4-phosphonate.

5. A composition in accord with claim 4 additionally comprising an effective amount of an antioxidant selected from the group consisting of octadecyl[3-(3,5-di-t-butyl-4-hydroxyphenyl)] propionate,
tetrakis[methylene(3,5-di-t-butyl-4-hydroxyhydrocinnamate)]methane,
2,6-di-t-butyl-4-methylphenol, and
di-n-octadecyl(3,5-di-t-butyl-4-hydroxybenzyl) phosphonate.

6. A composition of matter comprising polyolefin and an amount within the range of from about 0.1 to about 5 parts by weight per 100 parts by weight of said polyolefin of said mixture of claim 1.

7. A composition in accord with claim 6 wherein said polyolefin is a normally solid polymer selected from homopolymers and copolymers of aliphatic 1-olefins.

8. The composition of claim 6 wherein the mixture is a mixture of 2′,4′-di-t-butylphenyl 3,5-di-t-butyl-4-hydroxybenzoate and bis(1,1,1 - trifluoro - 7-methyl-2,4-octanedione)nickel(II).

9. The composition of claim 8 wherein said polyolefin is selected from homopolymers and copolymers derived from aliphatic 1-olefins having from 2 to 8 carbon atoms.

10. The composition of claim 9 wherein at least 90 mol percent of said polyolefin is derived from the polymerization of propylene and from about 0.5 to 10 mol percent of said polyolefin is derived from the polymerization of a comonomer selected from ethylene, butene-1, or hexene-1.

11. A composition in accord with claim 10 wherein the concentration by weight of said hydroxy-substituted phenyl benzoate is within the range of from about 0.1 to about 1 part by weight per 100 parts of said polyolefin and wherein the concentration of said metal complex of a partially fluorinated beta diketone is within the range of from about 0.1 to about 1 part by weight per 100 parts by weight of said polyolefin.

12. A composition in accord with claim 11 additionally comprising about 0.05 parts by weight per 100 parts polyolefin of octadecyl [3 - (3,5-di-t-butyl-4-hydroxyphenyl)] propionate.

References Cited
UNITED STATES PATENTS

| | | | |
|---|---|---|---|
| 3,692,738 | 9/1972 | Mathis et al. | 260—45.75 |
| 3,206,431 | 9/1965 | Doyle et al. | 260—45.85 |
| 3,368,997 | 2/1968 | Gordon | 260—45.8 |
| 3,218,294 | 11/1965 | Rodgers et al. | 260—45.75 |
| 3,285,855 | 11/1966 | Dexter et al. | 260—45.85 |

V. P. HOKE, Primary Examiner

U.S. Cl. X.R.

260—45.75 R, 45.85 B

UNITED STATES PATENT AND TRADEMARK OFFICE
CERTIFICATE OF CORRECTION

PATENT NO. : 3,838,099
DATED : September 24, 1974
INVENTOR(S) : Ronald D. Mathis It is certified that error appears in the above-identified patent and that said Letters Patent are hereby corrected as shown below:

Column 4, line 75, delete "polymer" and insert -- polymers --. column 5, line 43, delete "phosphonate" and insert -- hydroxybenzoate --.

Signed and Sealed this

Fourteenth Day of September 1976

[SEAL]

Attest:

RUTH C. MASON
Attesting Officer

C. MARSHALL DANN
Commissioner of Patents and Trademarks